United States Patent
Lin et al.

(10) Patent No.: US 8,689,483 B2
(45) Date of Patent: Apr. 8, 2014

(54) APPARATUS FOR CONTROLLING GROWTH OF ORGANISMS

(75) Inventors: Jung-Hsin Lin, Chu-Pei (TW);
Den-Hua Lee, Hsin Chu (TW);
Te-Cheng Chen, Chu-Pei (TW)

(73) Assignee: Thermo Plus Technology Inc., Chu-Pei (TW)

( * ) Notice: Subject to any disclaimer, the term of this patent is extended or adjusted under 35 U.S.C. 154(b) by 335 days.

(21) Appl. No.: 13/086,578

(22) Filed: Apr. 14, 2011

(65) Prior Publication Data

US 2012/0260574 A1    Oct. 18, 2012

(51) Int. Cl.
*A01C 1/00*    (2006.01)

(52) U.S. Cl.
USPC ............................................................. 47/17

(58) Field of Classification Search
USPC ............................................................. 47/17
See application file for complete search history.

(56) References Cited

U.S. PATENT DOCUMENTS

| | | | | |
|---|---|---|---|---|
| 3,905,153 | A * | 9/1975 | Enter | 47/58.1 R |
| 5,035,077 | A * | 7/1991 | Palmer | 47/17 |
| 8,061,080 | B2 * | 11/2011 | Loebl et al. | 47/58.1 LS |
| 8,373,361 | B2 * | 2/2013 | Smits et al. | 315/297 |
| 2010/0038440 | A1 * | 2/2010 | Ersavas | 236/51 |
| 2010/0115830 | A1 * | 5/2010 | Dube | 47/17 |
| 2012/0124902 | A1 * | 5/2012 | Moon et al. | 47/17 |
| 2012/0260574 | A1 * | 10/2012 | Lin et al. | 47/66.6 |

FOREIGN PATENT DOCUMENTS

| | | | | | |
|---|---|---|---|---|---|
| KR | 2006112532 | A | * | 11/2006 | G06F 19/00 |
| KR | 2007056247 | A | * | 6/2007 | A01G 9/24 |
| WO | WO 2010046939 | A1 | * | 4/2010 | G08C 17/02 |

* cited by examiner

*Primary Examiner* — Frank T Palo
(74) *Attorney, Agent, or Firm* — Jackson IPG PLLC

(57) ABSTRACT

An apparatus for controlling the growth of an organism includes a parameter control system, a remote control center, a control box, at least one environment-regulating device and at least one sensor. The parameter control system is stored with a plurality of operation modes, and environmental parameters that correspond to the respective operation modes and govern a variety of growth conditions for different species of organisms. The apparatus can automatically change the environmental conditions from one state to another, so as to meet the user's requirements and enhance the productivity without being limited by the ambient conditions.

3 Claims, 4 Drawing Sheets

US 8,689,483 B2

APPARATUS FOR CONTROLLING GROWTH OF ORGANISMS

BACKGROUND OF THE INVENTION

1. Field of the Invention

The present invention relates to an apparatus for controlling the growth of an organism, and more particularly, to a growth control apparatus that allows a user to rapidly switch one or more predetermined growth conditions selected from, for example, wavelength of light, temperature, concentration of carbon dioxide, concentration of oxygen, nutrients, water content, humidity and the like, from one state to another, based upon the species of the organism to be grown. Besides the biologically perceptible physical quantity described above, additional messages with positive energy, such as words, sounds, ideas and the like, may be transmitted to the organism according to the invention, so as to optimize the growth conditions required by the organism.

2. Description of the Prior Art

Traditional cultivating plantations typically require vast open fields and could easily suffer from unstable crop yield due to their susceptibility to weather changes, not to mention that they are highly vulnerable to attack by ambient pathogens. Therefore, high value crops are often cultivated in facilities with controlled light illumination and water/air supply, in a bid to harvest crops with stable quality and high yield.

It is known that almost all living organisms need sunlight to grow and that the duration, intensity and wavelength of light illumination, among other growth conditions for organisms, are critical factors influencing the quality of the organisms thus grown. Further, cultivatable plants can be roughly classified into light-demanding plants (such as fruit trees, flowering plants, broad-leaved trees, and cacti), semi-shade-loving plants (including most of potted flowers, and ornamental foliage plants with mottled or striped leaves), shade-tolerant plants (such as ornamental foliage plants with deep green leaves), according to their preference for cultivation sites. However, their sensitivity to light may vary with the environment where they grow. For instance, some organisms possess high tolerance to light at low temperature, but exhibiting much lower tolerance to light at an elevated temperature.

As such, the regulation of the level of light illuminated on a cultivated crop based on the cultivation characteristics thereof is a critical factor that determines success or failure of the cultivation. However, modern technology can only be applied to control the duration of light illumination, or adjust the intensity, frequency, duty ratio and phase shift of light illumination as taught in R.O.C. Patent Nos. 421994 and I231852. On the other hand, a biological parameter feedback control system is described in U.S. Pat. No. 6,725,598. The techniques known in the art are proved unable to rapidly obtain the environmental control parameters required by an organism and, thus, cannot built up a control system that is capable of achieving an optimum cultivation environment for the organism.

SUMMARY OF THE INVENTION

An object of the invention is to provide an apparatus for controlling the growth of an organism that is capable of acquiring the optimum parameters and environmental conditions for growing the organism based on the species of the organism.

In order to achieve the object described above, the apparatus according to the invention comprises a parameter control system, a remote control center, a control box, at least one environment-regulating device and at least one sensor. The parameter control system is stored with a plurality of operation modes, as well as environmental parameters that correspond to the respective operation modes and govern different growth conditions for different species of organisms, and the information regarding the control signals and energy requirements corresponding to the respective operation modes.

Especially, if a user is going to change the organisms nursed in the inventive apparatus from one species to another, the user can simply input the species name (or common name) of the new organism to be cultivated via the operation interface, thereby allowing the control box to receive the specific environmental parameters that govern the growth conditions required by the new organism. Then, the respective environment-regulating device are activated to automatically switch one or more of predetermined growth conditions selected from wavelength of light, temperature, concentration of carbon dioxide, oxygen concentration, nutrients, water content, humidity and the like, from one state to another, so as to satisfy the user's needs and enhance the productivity without being limited by the ambient conditions.

It should be noted that, besides the biologically perceptible physical quantity described above, additional energy-carrying messages, preferably those with positive, beautiful and beneficial energy in the form of words, sounds, ideas and the like, may be transmitted to the organism to optimize the growth conditions required by the organism, so as to harvest the target organism with stable quality and high yield.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE PREFERRED EMBODIMENTS

Figure 1:
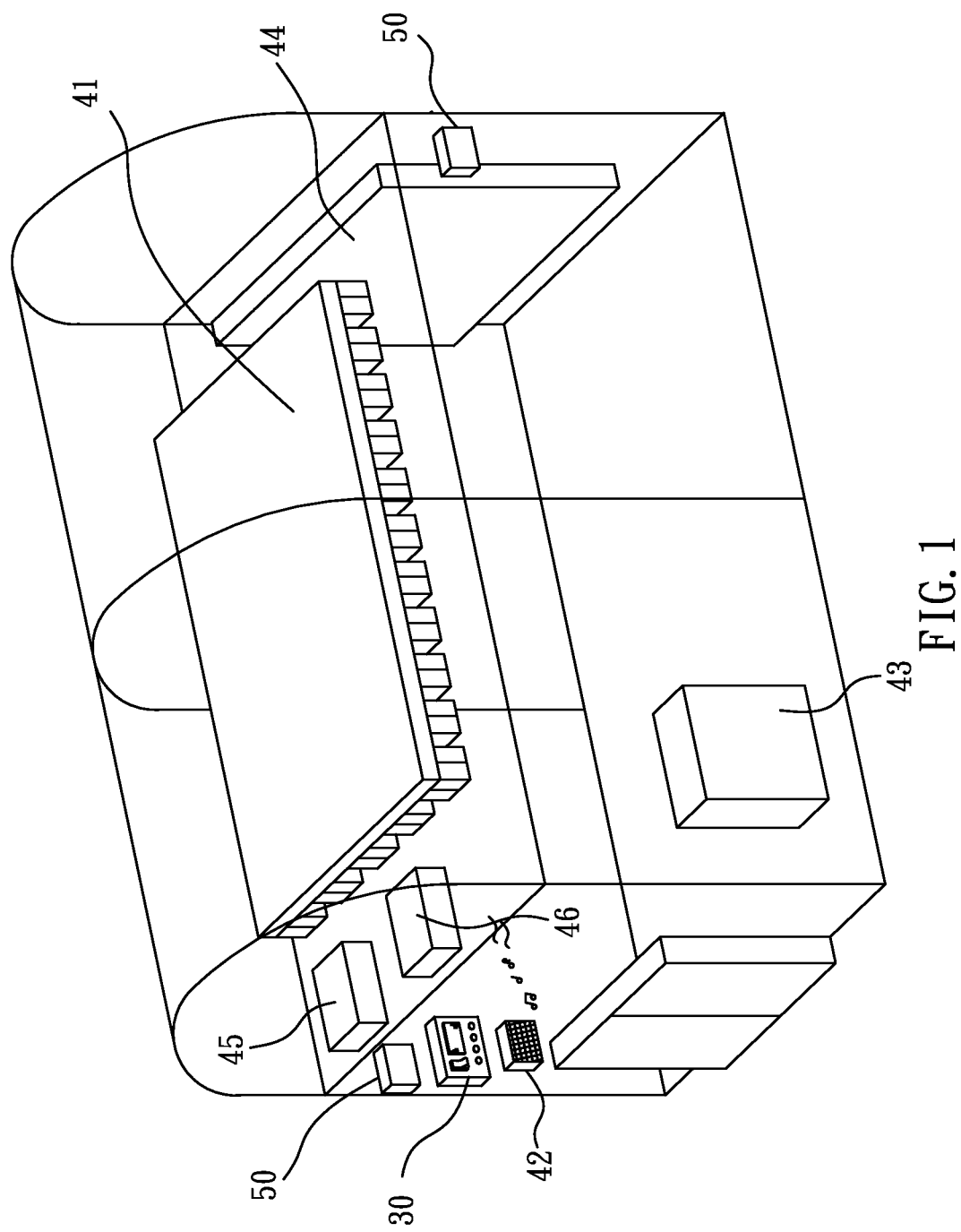
FIG. 1 is a schematic diagram illustrating the arrangement of constituting elements the apparatus for controlling the growth of organisms according to the invention.
Figure 2:
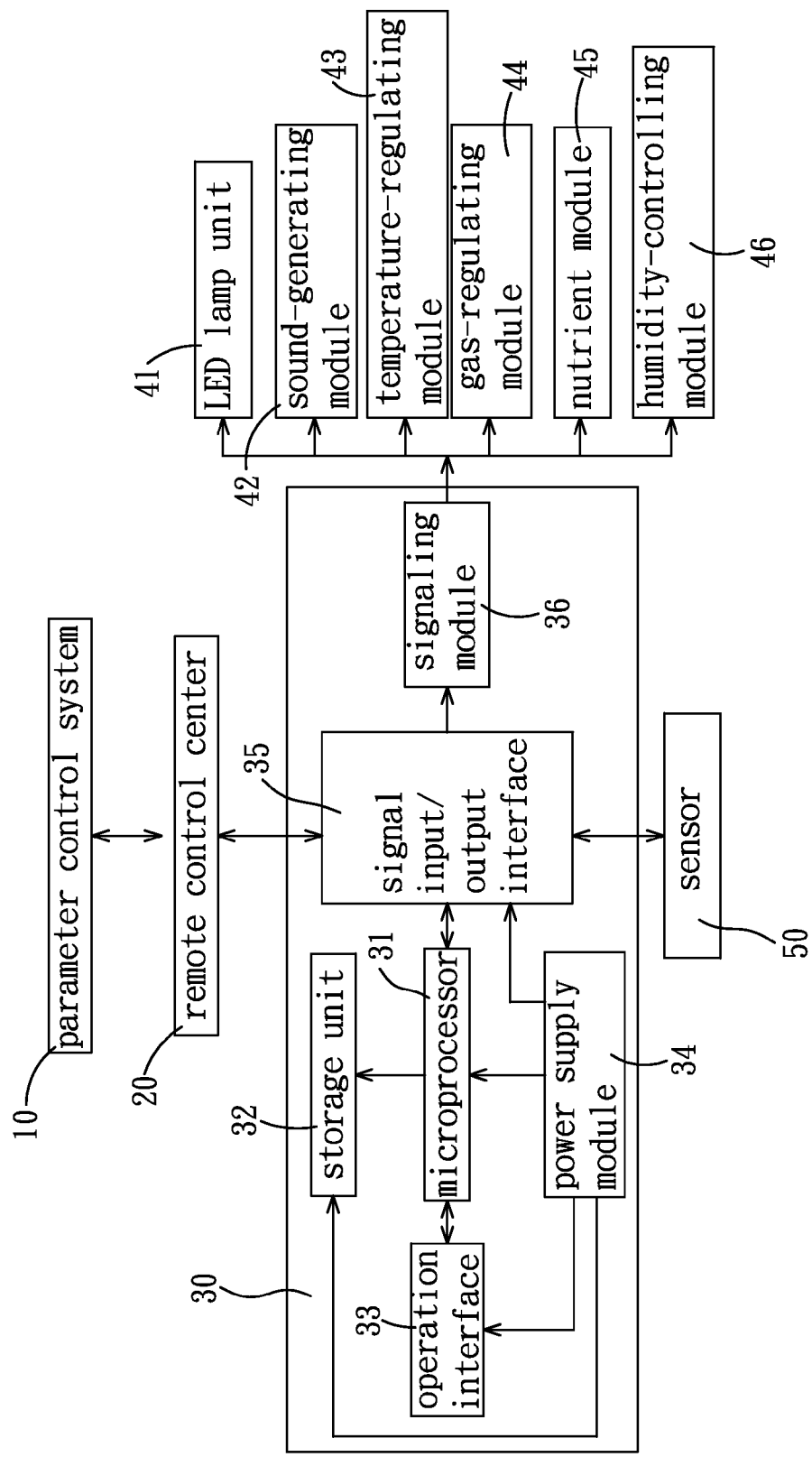
FIG. 2 is a schematic block diagram showing the relationship among the elements that constitute the apparatus for controlling the growth of organisms according to the invention.

The arrangement of the elements that constitute the apparatus for controlling the growth of organisms according to the invention is illustrated, by way of example, with reference to FIGS. 1 and 2. As illustrated, the apparatus comprises a parameter control system 10, a remote control center 20, a control box 30, at least one environment-regulating device and at least one sensor 50.

The parameter control system 10 is stored with a plurality of operation modes, as well as environmental parameters corresponding to the respective operation modes and governing different growth conditions for different species of organisms.

The remote control center 20 is connected to the parameter control system 10.

The control box 30 is connected to the remote control center 20 via a wired or wireless network and is employed to generate a control signal. In actual practice, the control box 30 is preferably equipped with a microprocessor 31, at least one storage unit 32, an operation interface 33, a power supply module 34 and a signal input/output interface 35 communicated with the at least one environment-regulating device and the at least one sensor 50. The power supply module 34 is connected to the microprocessor 31, the at least one storage unit 32, the operation interface 33 and the signal input/output interface 35, whereas the microprocessor 31 is connected to the storage unit 32, the operation interface 33 and the signal input/output interface 35. The control box 30 is also used to control a signaling module 36 that is adapted to generate an energy source, a message or a signal and transmit the same together with the control signal generated by the signal input/output interface 35 to the environment-regulating device.

The at least one environment-regulating device is mounted at a predetermined position with respect to an organism incubating zone and connected to the control box 30, so that it is activated upon receipt of the control signal to provide a physical quantity that can be received by the organism. Preferably, the environment-regulating device is selected from a light-emitting diode (LED) lamp unit 41 (the light emission therefrom may by way of example be adjusted in terms of certain parameters, such as frequency, amplitude, duration, duty ratio, phase shift and so on), a sound-generating module 42 (adapted to generate a wide variety of musical sounds), a temperature-regulating module 43, a gas-regulating module 44 (adapted to regulate the concentration of oxygen or carbon dioxide), nutrient module 45 (adapted to apply various types of fertilizers with different compositions) and a humidity-controlling module 46. Preferably, the LED lamp unit 41 includes at least one red-light LED, at least one green-light LED, at least one blue-light LED, and at least one infrared-light LED, at least one ultra-violet LED, at least one yellow-light LED and at least one orange-light LED.

The at least one sensor 50 is mounted at a predetermined position with respect to the organism incubating zone and electrically connected to the control box 30. The sensor 50 is configured to detect one or more conditions selected from carbon dioxide concentration, oxygen concentration, humidity, temperature, water content, nutrients, growth state of the cultivated organism (such as photosynthesis rate, morphology, and amount or content of excreta) and so on.

Figure 3:
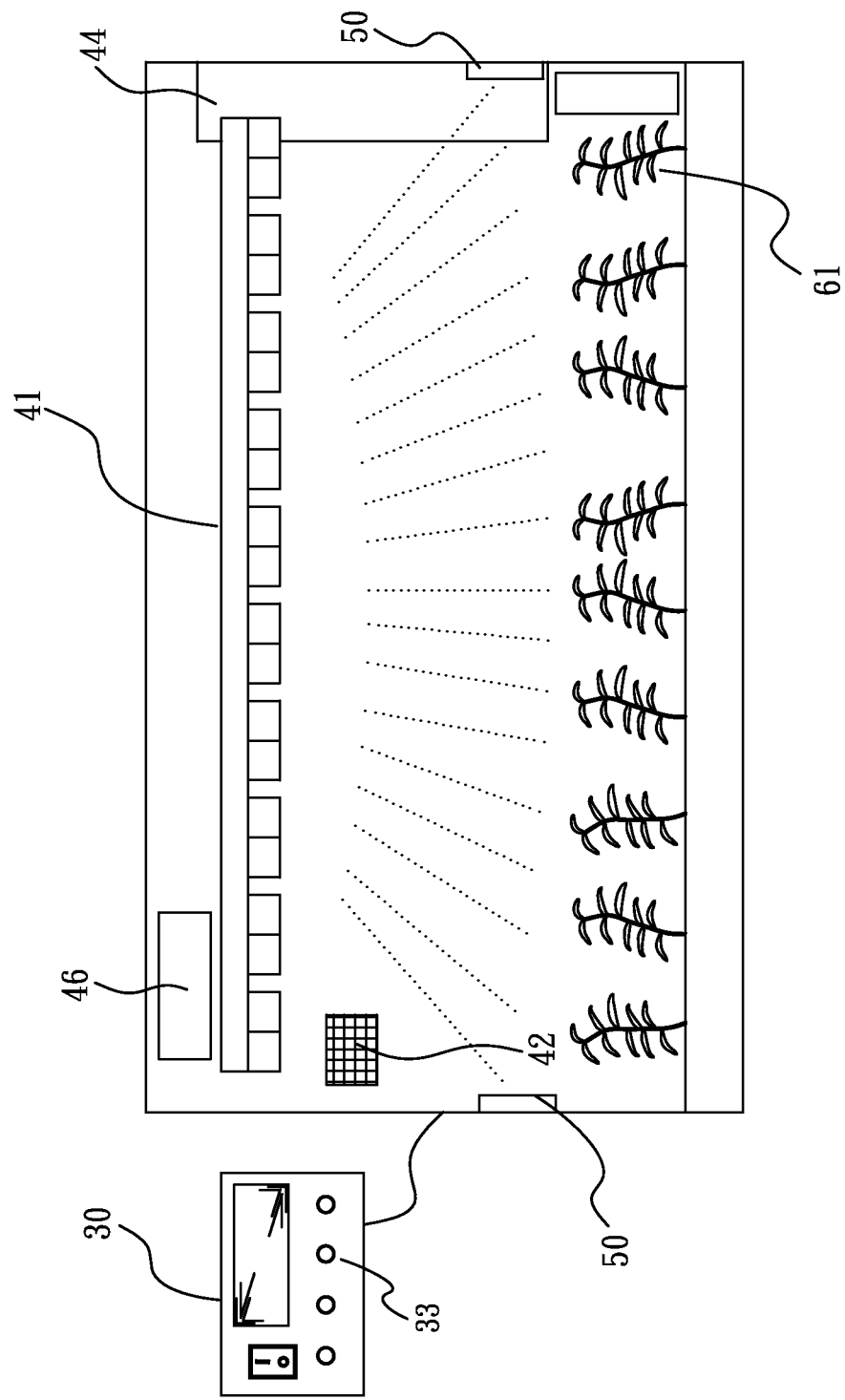
FIG. 3 is a schematic diagram showing the operation of the apparatus for controlling the growth of organisms according to the invention.

FIG. 3 is a schematic diagram showing the operation of the apparatus for controlling the growth of an organism according to the invention. As illustrated, the apparatus is used to cultivate plant seedlings 61. The apparatus is assembled beforehand by installment of the control box 30, the respective environment-regulating devices 41-46 and the sensor 50 in such a manner that the respective environment-regulating devices 41-46 and the sensor 50 are surely connected to the control box 30, whereby a user can input the species name (or common name) of the organism to be cultivated through the operation interface 33 of the control box 30.

After the input, the control box 30 transmits the information regarding the species of the organism to the remote control center 20 via a wired or wireless network. The remote control center 20 acquires, from the parameter control system 10, the operation mode corresponding to the organism species, which includes environmental parameters suitable for the growth of organism species (such as wavelength of light, humidity level, gaseous content and nutrients, as well as the suitable energy source or message to be applied to the organism, and the control signals corresponding thereto), and then feedbacks the corresponding information to the control box 30. Upon being informed of the environmental parameters, the control box 30 sends out control signals that command the respective environment-regulating devices 41-46 to automatically provide environmental conditions suitable for the growth of the plant seedlings 61 according to the environmental parameters, and further command the signaling module 36 to generate a biologically perceptible physical quantity, such as an energy source, a message or a signal, which may by way of example be musics with different tones and rhythms, thereby facilitating the growth of the organism. The control box 30 can automatically optimize the growth conditions for the plant seedlings 61 by monitoring the actual growth state of the seedlings 61.

If a user is going to change the plants cultivated in the inventive apparatus from one species to another, the user can simply input the species name (or common name) of the new plant to be cultivated via the operation interface 33 of the control box 30, thereby allowing the remote control center 20 to acquire the operation mode corresponding to the new plant species. As a result, the apparatus automatically changes the environmental conditions from one state to another, so as to satisfy the user's needs.

Figure 4:
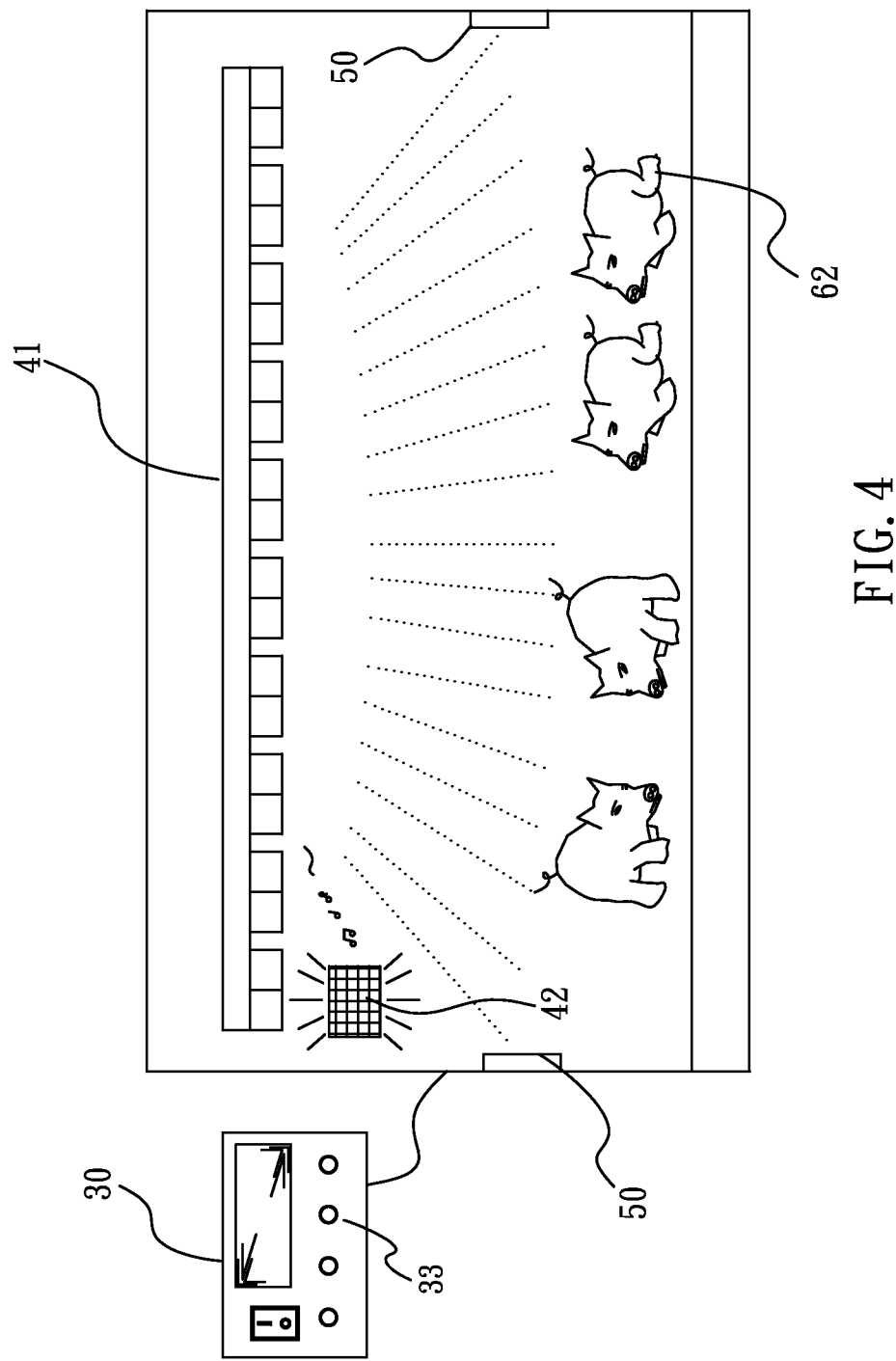
FIG. 4 is another schematic diagram showing the operation of the apparatus for controlling the growth of organisms according to the invention.

It should be noted that the invention can be suitably used for cultivating organisms other than plants. As shown in FIG. 4, the inventive apparatus is utilized to nurse animals 62.

In conclusion, the apparatus for controlling the growth of an organism as disclosed herein can surely achieve the intended objects and effects of the invention by virtue of the structural arrangements described above. While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit of the invention and the scope thereof as defined in the appended claims.

What is claimed is:

1. An apparatus for controlling the growth of an organism comprising:

a parameter control system stored with a plurality of operation modes and environmental parameters that correspond to the respective operation modes and govern different growth conditions for different species of organisms;

a remote control center connected to the parameter control system;

a control box connected to the remote control center and adapted to generate a control signal;

at least one environment-regulating device mounted at a predetermined position with respect to an organism incubating zone, the at least one environment-regulating device being connected to the control box, so that the control box is configured to accept user input to inform the remote control center of a user's selection of one of the different species of organisms to make the remote control center to acquire the operation mode and the environmental parameters corresponding to the selected organism species from the parameter control system and then feedback the corresponding operation mode and environmental parameters, and the control box, upon receiving the operation mode and environmental parameters, sends out a control signal to command the at least one environment-regulating device to automatically provide environmental conditions suitable for the growth of the selected organism species and to command the signaling module to generate a biologically perceptible physical quantity to facilitate the growth of the selected organism species, and wherein the environment-regulating device is selected from a light-emitting diode (LED) lamp unit, a sound-generating module, a temperature-regulating module, a gas-regulating module, nutrient module and a humidity-controlling module;

at least one sensor mounted at a predetermined position with respect to the organism incubating zone and electrically connected to the control box; and wherein the control box is provided with a microprocessor, at least one storage unit, an operation interface, a power supply module, a signal input/output interface and a signaling module for generating an energy source, a message or a signal, and wherein the power supply module is connected to the microprocessor, the at least one storage unit, the operation interface and the signal input/output interface, and wherein the microprocessor is connected to the storage unit, the operation interface and the signal input/output interface; and wherein the LED lamp unit is activated, upon receipt of the control signal from the control box, to adjust light emission therefrom in terms of one or more parameters selected from the group consisting of frequency, amplitude, duration, duty ratio and phase shift.

2. The apparatus for controlling the growth of an organism according to claim 1,
wherein the control box is connected to the remote control center via a network.

3. The apparatus for controlling the growth of an organism according to claim 1,
wherein the at least one sensor is configured to detect one or more conditions selected from the group consisting of temperature, carbon dioxide concentration, oxygen concentration, nutrients, water content and humidity.

\* \* \* \* \*